United States Patent [19]

Tornqvist et al.

[11] 3,865,749

[45] *Feb. 11, 1975

[54] BUTADIENE POLYMERIZATION CATALYST

[75] Inventors: Erik G. M. Tornqvist, Scotch Plains; Charles Cozewith, Westfield, both of N.J.

[73] Assignee: Exxon Research and Engineering Company, Linden, N.J.

[ * ] Notice: The portion of the term of this patent subsequent to May 16, 1989, has been disclaimed.

[22] Filed: Aug. 30, 1973

[21] Appl. No.: 392,966

[52] U.S. Cl. ............ 252/429 B, 260/88.2, 260/94.3
[51] Int. Cl. ............................................... B01j 11/84
[58] Field of Search ................................. 252/429 B

[56] References Cited
UNITED STATES PATENTS 3,663,450   5/1972   Cozewith et al. ............... 252/429 B
3,779,944   12/1973  Cozewith et al. ............... 252/429 B

*Primary Examiner*—Patrick P. Garvin
*Attorney, Agent, or Firm*—Henry E. Naylor

[57] ABSTRACT

Ziegler-type hydrocarbon-soluble catalyst systems for the polymerization of conjugated diolefins, or mixtures thereof, to obtain high molecular weight polymers possessing varying proportions of trans-1,4 units, in the range of 50–90%. The catalyst systems are based on a nonreduced salt of titanium, an organometallic compound, and an iodine-containing compound, or iodine corresponding to the generalized formula $Ti(halide)_4-M_nI_m-AlR_aX_{3-a}$. M is aluminum or tetravalent tin, $n$ is 0 or 1, $m$ is the valence of M and when $n$ is 0, $m$ is 2, X is Cl, Br or I, $a$ is 2 to 3, R is alkyl, halide is Cl, Br or I and when halide is I, $M_nI_m$ is omitted.

12 Claims, No Drawings

BUTADIENE POLYMERIZATION CATALYST

BACKGROUND OF THE INVENTION

1. Field of the Invention

This invention relates to a catalyst system and a process for using same, useful for the stereospecific polymerization of butadiene. More specifically, the catalyst comprises an organoaluminum compound, a Lewis base, and a Ti(+4) halogen - $M_nI_m$ composition. This catalyst system is useful in the production of polybutadiene homopolymers or copolymers in which the ratio of trans-1,4 to cis-1,4 units can be varied over wide limits and especially within the particularly desirable trans-1,4 range of 50 to 90% of total unsaturation.

2. Description of the Prior Art

Ziegler-type multi-component catalyst systems such as transition metal halides combined with organometallic compounds have been known for well over a decade. The ability of such catalysts to polymerize butadiene to elastomeric products has also been recognized, but the polymers thus produced have generally been characterized by high cis-1,4 content rather than trans-1,4 addition units. Thus, for example, in U.S. Pat. No. 3,471,461, there is disclosed the use of $TiX_3 \cdot nAlI_3 \cdot xAl(alkyl)_3$ catalyst systems for the polymerization of butadiene, in which the steric arrangement of the polybutadiene is predominantly that resulting from cis-1,4 addition.

Other catalysts, particularly based on vanadium compounds, capable of producing polybutadienes containing more than 90% trans-1,4 addition units have also been developed, but the polymers thus produced have been characterized by resinous or plastic rather than elastomeric properties.

We had previously discovered that certain trivalent titanium halide catalyst systems, used in conjunction with particular bases, produced polybutadienes containing a predominant amount of 1,4-addition units. These catalyst systems are taught in U.S. Pat. No. 3,663,450 and copending application Ser. No. 175,758, filed Aug. 27, 1971 now U.S. Pat. No. 3,779,944.

In U.S. Pat. No. 3,663,450, a partially reduced titanium halide, notably $TiCl_3$, is precomplexed with a Lewis base and forms a final catalyst capable of producing high cis-1,4 polybutadiene, while in Ser. No. 175,758 now U.S. Pat. No. 3,779,994, the Lewis base is not precomplexed with the titanium halide component and may be added to the polymerization zone in any order with respect to the latter component. This difference is important in that it provides for the production of polybutadienes having variable amounts of trans-1,4 addition units, up to about 90% in the polymer.

It is also known that certain titanium tetrahalides are useful in polymerizing butadiene. Generally, they produce polybutadienes containing 85-95% cis-1,4 addition units. Typical of these are a series of iodine-containing catalyst systems, such as $TiI_4$–$AlR_3$, $TiX_4$–$I_2$–$AlR_3$, and $TiX_4$–$AlI_3$–$AlR_3$, where X is chlorine or bromine. These systems have been published in several patents. See Belgian Pat. No. 551,851; Belgian Pat. No. 602,496; U.S. Pat. No. 3,245,976, and British Pat. No. 1,138,840.

Previously, when Lewis bases were added to titanium tetrahalide-type catalysts in amounts necessary to effect a noticeable change in the stereochemistry of the polymerization reaction, there was always an accompanying drastic decrease in the polymerization rate and catalyst efficiency.

The inventors have now found surprisingly that the addition of certain Lewis base to a general catalyst system comprised of an organoaluminum, having the formula $AlR_aX_{3-a}$, and a Ti(+4) halide - $M_nI_m$ composition causes a decrease in the cis-1,4 addition of the butadiene monomer and a corresponding increase in the trans-1,4 addition without the catalyst efficiency being adversely affected to any significant extent.

The inventors have also found that the novel catalyst system is capable not only of efficiently producing polybutadienes containing larger proportions of trans-1,4 addition units than those titanium based catalysts disclosed in the prior art, but also of producing predominantly elastomeric polybutadienes containing 50–90% of such units. This is a particularly surprising and significant discovery. Such polymers of corresponding over-all compositions which have been prepared in the past with the help of other catalysts or polymerization methods have generally exhibited a considerable amount of crystallinity and plastic character. While the inventors do not wish to be bound by any particular explanation for the difference in physical properties between the 50–90% trans-1,4 polybutadienes prepared according to this invention and those of the prior art, it is believed that the much more elastomeric character of the former is the consequence of the more random distribution of the cis-1,4 and trans-1,4 units in the polymer molecules than in the polymers heretofore known.

The purpose of this invention therefore is to provide a new catalyst for controlling the steric configuration of the 1,4 addition units of polymers of conjugated dienes, and copolymers thereof, and a process for employing same to produce such polymers and in particular to a polybutadiene containing a high percentage of trans-1,4 addition units and having predominantly elastomeric properties.

SUMMARY OF THE INVENTION

In general, this invention relates to a catalyst system broadly belonging to the Ziegler group, comprising a non-reduced salt of titanium, an organometallic compound and an iodine-containing compound or iodine corresponding to the generalized formula

(I) $Ti(halide)_4$—$M_nI_m$—$AlR_aX_3$—a where the halide may be I, Cl, or Br. When the halide is I, $M_nI_m$ is omitted. M is either aluminum or tin (+4), n is 0 or 1, and m is the valence of M and when $n=0$, $m=2$. In the organoaluminum component, R is an alkyl having 1 to 12 carbon atoms, X is Cl, Br, or I and a is any number from 2 to 3.

To the basic catalyst system is added certain Lewis bases such as tetrahydrothiophene, tetrahydrothiopyran, 2-methyl tetrahydrothiophene, tetrahydrofuran, tetrahydropyran, 2,5-dimethyl tetrahydrofuran, and the like. The ratio of Lewis base to titanium in the catalyst mixture controls the steric arrangement of the monomer units, and may range from 1:1 to 500:1, depending upon the amount of trans-1,4 structural units desired in the polybutadiene.

Particular examples of the titanium halide —$M_nI_m$ component are:

(II) $TiI_4$ (III) $TiX_4$—$I_2$, where X is Cl or Br
(IV) $TiX_4$—$AlI_3$, where X is Cl or Br
(V) $TiX_4$—$SnI_4$, where X is Cl or Br

PREFERRED EMBODIMENTS

The catalyst system of this invention is principally useful for the polymerization of conjugated diolefin monomers, such as 1,3-butadiene. However, the catalysts are also useful for forming copolymers of conjugated dienes with other olefin monomers.

The Lewis bases that may be used are heterocyclic thia, aza and oxa compounds, specifically cyclic thioethers, cyclic ethers, and their derivatives. Such compounds include tetrahydrothiophene, tetrahydrothiopyran, tetrahydrofuran, tetrahydropyran, 2,5-dimethyl tetrahydrofuran, 3-phenyl tetrahydrofuran, 3-ethyl-4-propyl tetrahydrofuran, 2,5-dimethyl 3-chloro tetrahydrofuran, 2-methyl tetrahydrothiophene, 3-phenyl tetrahydrothiophene, 3-ethyl-4-propyl tetrahydrothiophene and 2,5-dimethyl 3-chloro tetrahydrothiopyran. Particularly preferred among these compounds is tetrahydrothiophene; however, other cyclic thioethers may also be advantageously employed.

As a general rule, the higher the concentration of the Lewis base in the polymerization zone, the higher will be the trans 1,4 content of the polymer until a certain upper limit has been reached. Thus, from 50-90% of the resulting polybutadiene may be of the trans-1,4 configuration.

The organoaluminum compounds that can be advantageously used for making the catalysts of this invention are trialkylaluminums, such as trimethylaluminum, triethylaluminum, triiosbutylaluminum, trihexylaluminum, triiosprenylaluminum, etc. Mixtures of trialkylaluminums and dialkylaluminum halides and alkoxides may also be successfully employed. Among suitable dialkylaluminum compounds to be used in conjunction with trialkylaluminums may be mentioned dialkylaluminum halides, particularly dialkylaluminum iodides, dialkylaluminum alkoxides, etc.

The hydrocarbon diluents used in making the polybutadiene of the present invention should be liquids at the conditions of temperature and pressure used in the polymerization reaction. Suitable diluents include $C_4$ to $C_{10}$ saturated aliphatic or cycloaliphatic hydrocarbons, such as n-butane, n-pentane, n-heptane, isooctane, n-decane, cyclohexane, methylcyclohexane, etc. and aromatic compounds such as benzene, toluene, xylene, tetralin, isopropyl benzene, etc. In a batch polymerization, the diluent can be added to the reaction zone either prior to, with, or subsequent to the monomer. The same holds true for the aluminum alkyl component.

However, when $AlI_3$ or $SnI_4$ is used as a component of the catalyst (species IV and V, respectively), they are normally added prior to addition of monomer and aluminum alkyls.

The Lewis base may be added to the polymerization zone in virtually any sequence with the other ingredients, but it is generally preferable to add at least the Ti(halide)$_4$ and monomer before adding the Lewis base. However, in a continuous process, the base would normally be added with either the monomer or the aluminum alkyl. In such a continuous system, the titanium tetrahalide along with solvent and either $I_2$, $AlI_3$ or the $SnI_4$, depending on the particular catalyst combination used, would be added as a mxiture to the reactor.

While the $TiX_4$—$nAlI_3$—$xAlR_3$ and Lewis base may be combined in many different ways to produce an accctive polymerization catalyst, a particularly preferred embodiment of this invention involves first dissolving the $TiX_4$—$nAlI_3$ component in all or part of the polymerization diluent or solvent, then adding the monomer and finally adding the $AlR_3$ and the Lewis base. Alternatively, the $TiX_4$—$nAlI_3$ may be added to the polymerization diluent containing the monomer whereupon the $AlR_3$ and the Lewis base may be added to form the complete catalyst and start the polymerization. Although the Lewis base may be successfully added before the trialkylaluminum, better results are usually obtained if the Lewis base is added either together with or after the trialkylaluminum, especially when the base is to be employed in the rather large concentrations required for production of polymers containing a predominant amount of trans-1,4 units. In such cases the base seems to interfere with and slow down the reaction between the alkyl metal and the $TiX_4$—$nAlI_3$ component required for formation of the catalytically active species. By properly utilizing the latter mode of base addition, i.e., by adding the base after the polymerization has been initiated with the unmodified $TiX_3$—$nAlI_3$—$xAlR_3$ catalyst system, it may actually be possible to obtain A-B type block copolymers in which the first (A) block has the high cis-1,4 structure characteristic of the polybutadienes made with the unmodified catalyst system and the second (B) block has the higher trans-1,4 structure characteristic of the polybutadienes made with the modified catalyst system. In this instance and in subsequent use, the term "modifier" refers to the Lewis base. On the other hand, if the Lewis base is added immediately after the $AlR_3$, the polymerization may be initiated rapidly without any significant amount of rather pure cis-1,4 polybutadiene blocks being formed. Hence, this method is particularly suitable for the production of high trans-1,4 polybutadiene.

The same considerations are applicable to the catalyst species which use $I_2$ or $SnI_4$.

The total amount of catalyst employed in the polymerization of butadiene may vary within rather wide limits depending upon the particular conditions of polymerization, but is generally in the range of from about 0.001 to about 0.5 wt. %, preferably 0.01 to 0.2 wt. % based upon the total reaction mixture comprising the butadiene monomer to be polymerized and the reaction diluent.

In general, it will be found that, for the same catalyst composition, the molecular weight of the polymer decreases as the catalyst concentration is increased, provided, of course, that all the other conditions are kept constant, e.g., monomer concentration, temperature of polymerization, etc. Thus, variation in the amount of catalyst employed per unit of monomer may advantageously be used to control the molecular weight of the polymer obtained. Other factors, such as Al/Ti ratio, polymerization temperature, and the addition of chain transfer agents, can be used advantageously to control the molecular weight of the polymer product of the invention.

In Component III ($TiX_4$—$I_2$), the molar ratio of $TiX_4$ to $I_2$ can vary from about 1:1 to about 1:20. The preferred range is from 1:1 to about 1:5. In Component II ($TiI_4$) and Component III, the molar ratio of aluminum alkyl to TiX$_4$ ranges from 20:1 to 1:1, more preferably from 10:1 to 2:1.

In Component IV (TiX$_4$—AlI$_3$), the preferred molar ratio of TiX$_4$/AlI$_3$ in the range of 1:1-1:10 and the ratio of AlR$_3$ to (TiX$_4$—AlI$_3$) is preferably in the range of 2:1 to 4:1. The same holds true for Component V (TiX$_4$—SnI$_4$).

For any given molar concentration of the titanium component, the ratio of Lewis base to titanium in the catalyst mixture controls the steric arrangement of the monomer units in the resulting polybutadiene and, in general, the greater the concentration of Lewis base employed, the higher the trans-1,4 content in the polymer up to a certain upper limit. Thus, to obtain the same proportion of trans-1,4 unsaturation in different polymerization involving varying concentrations of the titanium component, one will have to increase the ratio of Lewis base to titanium compounds as the concentration of the latter is decreased. The molar ratio of Lewis base to titanium compound may vary from 1:1 to 500:1 depending upon the amount of tran-1,4 structural units desired in the polybutadiene and the concentration of the titanium component. Preferably, the molar ratio of Lewis base to titanium ranges from 10:1 to 200:1.

The conditions of the polymerization reaction can vary over a wide range. Generally, temperatures ranging from less than 0°C to about 100°C can be used; however, temperatures ranging from 5° to 100°C are preferred. Pressures ranging from subatmospheric to about 10 atmospheres can be employed depending primarily upon the vapor pressure of the diene and diluent in the polymerization reaction. A preferred range would, however, be from atmospheric to about 5 atmospheres. Reaction times ranging from a minute to 250 hours can be utilized depending primarily on the time needed for the desired monomer conversion under the polymerization conditions used; however, it is usually possible to achieve close to the maximum conversion obtainable in 24 hours or less.

The reaction vessel used for the polymerization can be constructed from any material that is inert to the reactants and is capable of withstanding the operating pressures. Reactors made of glass, stainless steel and glass lined steel may thus be employed.

Upon completion of the polymerization, the catalyst is deactivated by the addition of a small quantity of a suitable deactivating agent, such as a lower alkanol or a solution of an alkoxide of an alkali or alkaline earth metal, e.g., sodium isopropoxide, sodium ethoxide, potassium t-butoxide, etc. The polymer formed may be recovered from the polymerization mixture by standard techniques such as removal of the diluent by steam distillation or by addition of an anti-solvent to precipitate the polymer. The solid polymer obtained is then isolated by filtration, centrifugation, or similar methods.

The molecular weights, expressed as viscosity average molecular weight, of the butadiene polymers of the present invention range upwards from 100,000 and preferably from 150,000 to 3,000,000. The butadiene polymers contain reactive unsaturation and may be cured to form highly useful vulcanized materials of varying properties. Any one of a wide variety of curing procedures may be employed, such as sulfur curing or free radical curing.

In the uncured state, the instant butadiene polymers exhibit tensile strengths of the order of 150 to 2000 psi, with % elongation up to about 1300. The percent permanent set after breaking ranges from about 25 to about 300.

In the cured state, the instant butadiene polymers exhibit tensile strengths of the order of 1200 to 2500 psi, with % elongation up to about 900.

The polymers of this invention have many varied uses. They may be employed in the preparation of tires, inner tubes, hose and tubing, wire and cable coatings, as well as for a wide variety of coated or molded articles. Those polymers having from 70-90% trans unsaturation are particularly suitable for the preparation of injection-molded articles and possess thermoelastic properties.

This invention and its advantages will be better understood by reference to the following examples.

EXAMPLES 1-4

A number of butadiene polymerization were carried out with tetrahydrothiophene (THT) modified TiCl$_4$—I$_2$ catalyst systems, using aluminum triethyl as the aluminum alkyl. The polymerizations were carried out inside a nitrogen containing dry box in capped ½ gallon jars equipped with magnetic stirrers. The TiCl$_4$, and 100g. of monomer were added to the reaction vessel, to which 450 ml benzene had first been added.

The AlEt$_3$ and I$_2$, which had been dissolved in 50 ml of benzene, were then added to the reactor followed immediately by the of THT. The polymerizations were conducted at room temperature. Actual quantities of catalyst components, etc. and reaction times are shown in Table I, along with the results of the experiments.

The polymerizations were terminated by decomposition of the catalyst through the addition of 30 ml of a 0.2M solution of sodium isopropoxide in isopropanol. One-half gram of N-phenyl-2-naphthylamine dissolved in 500 ml benzene was then added as an oxidation inhibitor to the reaction medium, whereupon the polymer solution was transferred to an open pan and the polymer recovered by evaporation of the diluent, first at atmospheric pressure and room temperature and then in vacuo at about 50°C.

As shown by the results in the table, the unmodified, i.e., THT free, catalysts produced high mol. wt. polybutadiene containing about 90% cis-1,4 addition units. All of the modified catalysts on the other hand produced polymers with a preponderant amount of trans-1,4 addition units, up to about 80%.

TABLE I

TiCl$_4$-I$_2$-AlR$_3$-THT CATALYST SYSTEM
(100g. Butadiene, 500 ml Benzene, Room Temp.)

| Catalyst | 1 | 2 | 3 | 4 |
|---|---|---|---|---|
| TiCl$_4$, mg | | 19.0 | | 19.0 |
| I$_2$, mg | | 50.8 | | 50.8 |
| AlEt$_3$, mg | | 57.1 | | 68.5 |
| THT, mg | 0 | 617 | 0 | 441 |
| AlEt$_3$/TiCl$_4$ (molar ratio) | 5 | 5 | 6 | 6 |

TABLE I—Continued

TiCl$_4$-I$_2$-AIR$_3$-THT CATALYST SYSTEM
(100g. Butadiene, 500 ml Benzene, Room Temp.)

| Catalyst | 1 | 2 | 3 | 4 |
|---|---|---|---|---|
| I$_2$/TiCl$_4$ (molar ratio) | 2 | 2 | 2 | 2 |
| THT/TiCl$_4$ (molar ratio) | 0 | 70 | 0 | 50 |
| Reaction Time (hrs.) [a] | 18.5 | 67 | 18.5 | 116 |
| Results | | | | |
| Polymer Yield, % | 72.2 | 59.1 | 89.7 | 71.9 |
| Polymer mol. wt. × 10$^{-3}$ [b] | 435 | 185 | 460 | 225 |
| Polymer unsaturation | | | | |
| Vinyl, % | 5.2 | 9.0 | 5.0 | 11.9 |
| Cis, % | 88.6 | 12.9 | 90.9 | 15.9 |
| Trans, % | 6.2 | 78.1 | 4.1 | 72.2 |

[a] Complete reaction often occurred within a period of time considerably shorter than those indicated in the table.
[b] According to the correlation of Johnson and Wolfangel, Ind. Eng. Chem., 44, 752 (1952).

EXAMPLES 5–10

A number of butadiene polymerizations were carried out with THT, aluminum triethyl, TiCl$_4$, and I$_2$, according to the general procedure of Examples 1–4 but with differences in the order of addition of the various components.

The order of addition was:
Run 5: TiCl$_4$ - monomer (1,3-butadiene) —AlEt$_3$—I$_2$. [no THT]
6: TiCl$_4$ - monomer-AlEt$_3$+THT premixed in 50 ml benzene, I$_2$.
7: TiCl$_4$,I$_2$, monomer, AlEt$_3$ dissolved in 50 ml benzene.
8: same as 7, but with the THT added together with the AlEt$_3$.
9: AlEt$_3$, TiCl$_4$+I$_2$ premixed in 50 ml benzene - monomer.
10: same as 9, except that THT was added after the monomer.

As the total amount of benzene used as diluent was 500 ml, 450 ml benzene was added at the beginning in Runs 6-10, while 500 ml was added at the beginning in Run 5.

The reactions were terminated, and product recovered, in the same manner as in Examples 1–4.

The results of the experiments are shown in Table II. It is apparent that the addition of THT causes a marked change in the stereospecificity from predominantly cis-1,4 to predominantly trans-1,4 addition.

EXAMPLE 11

When butadiene is polymerized in the same manner as in Example 2, substituting tetrahydrothiopyran for THT, the recovered polybutadiene has a trans-1,4 configuration of up to about 80%. The polybutadiene is recovered in good quantities and has a molecular weight in excess of 150,000 (as determined by the correlation of Johnson and Wolfangel, Ind. Eng. Chem., 44, 752 (1952).)

EXAMPLES 12–18

A series of polymerization experiments were conducted to prepare high trans-1,4 content polybutadiene. The catalyst system was TiCl$_4$, AlI$_3$, aluminum triethyl (AlEt$_3$), and tetrahydrothiophene (THT).

All polymerizations were carried out with capped ½ gallons jars equipped with magnetic stirrers, the jars being inside a nitrogen-containing dry box. The order of addition of the various components was benzene, TiCl$_4$, AlI$_3$ and butadiene followed by AlEt$_3$, which was added either alone or mixed with THT as indicated in Table III.

The polymerizations were terminated by decomposition of the catalyst through the addition of 30 ml of a 0.2M solution of sodium isopropoxide in isopropanol. One-half gram of N-phenyl-2-naphthylamine dissolved in 500 ml benzene was then added as an oxidation inhibitor to the reaction medium, whereupon the polymer solution was transferred to an open pan and the

TABLE II

TiCl$_4$-I$_2$-AlR$_3$-THT
Butadiene Catalyst System
(100g. Butadiene, 500 ml Benzene, Room Temperature)

| Catalyst | 5 | 6 | 7 | 8 | 9 | 10 |
|---|---|---|---|---|---|---|
| TiCl$_4$, mg | 19.0 | 19.0 | 19.0 | 19.0 | 19.0 | 19.0 |
| I$_2$, mg | 101.5 | 101.5 | 50.8 | 50.8 | 50.8 | 50.8 |
| AlEt$_3$, mg | 114.2 | 114.2 | 79.9 | 79.9 | 79.9 | 79.9 |
| THT, mg | 0 | 441 | 0 | 441 | 0 | 529 |
| I$_2$/TiCl$_4$ (molar ratio) | 4 | 4 | 2 | 2 | 2 | 2 |
| THT/TiCl$_4$ (molar ratio) | 0 | 50 | 0 | 50 | 0 | 60 |
| AlEt$_3$/TiCl$_4$ (molar ratio) | 10 | 10 | 7 | 7 | 7 | 7 |
| Reaction Time (hrs) [a] | 18.5 | 19 | 69 | 18 | 67.5 | 42 |
| Results: | | | | | | |
| Polymer yield, % | 70.4 | 67.2 | 83.6 | 55.2 | 91.7 | 53.9 |
| Polymer mol. wt. × 10$^{-3}$ [b] | 225 | 230 | 400 | 275 | 365 | 350 |
| Polymer unsaturation | | | | | | |
| Vinyl, % | 5.3 | 4.2 | 5.0 | 7.9 | 4.9 | 2.5 |
| Cis, % | 87.1 | 23.7 | 88.2 | 15.1 | 91.5 | 12.3 |
| Trans, % | 7.6 | 72.0 | 6.8 | 77.0 | 3.6 | 85.2 |

[a] See Table I.
[b] See Table I.

polymer recovered by evaporation of the diluent, first at room temperature and atmospheric pressure and then in vacuo at about 50°C.

The interesting physical properties of polymers prepared according to this invention are reported in U.S. Pat. application Ser. No. 175,758, filed Aug. 27, 1971, now U.S. Pat. No. 3,779,944, which describes the preparation of similar polymers but with a different catalyst system.

EXAMPLES 19-22

Four runs were made following the procedure of Examples 12-18, substituting $TiBr_4$ for the $TiCl_4$.

The details of the experiments and the results are shown in Table IV.

EXAMPLES 23-28

Following the procedures and using the equipment of Examples 1-4, a series of experiments were conducted using the catalyst system:

$$TiX_4 - SnI_4 - AlR_3$$

with tetrahydrothiophene. Both $TiCl_4$ (Examples 23-26) and $TiBr_4$ (Examples 27 and 28) were used.

The polybutadiene was recovered in the same manner as previously described in Examples 1-4. The results are shown in Table V.

TABLE III

EFFECT OF THT ADDITION OF BUTADIENE POLYMERIZATION WITH $TiCl_4$-$xAlI_3$-$yAlR_3$ CATALYSTS

| Catalyst | (100 g butadiene, 500 ml benzene, room temp.) | | | | | | |
|---|---|---|---|---|---|---|---|
| | 12 | 13 | 14 | 15 | 16 | 17 | 18 |
| $TiCl_4$, mg | | | 19.0 | | | 19.0 | |
| $AlI_3$, mg | | | 122.3 | | | 204.0 | |
| $AlEt_3$, mg[a] | | | 102.7 | | | 137.0 | |
| THT, mg[a] | | 264.6 | 441 | 617 | | 441 | 705.4 |
| $AlEt_3$/$AlI_3$/$TiCl_4$ molar ratio | | | 9/3/1 | | | 12/5/1 | |
| THT/$TiCl_4$ molar ratio | 0 | 30 | 50 | 70 | 0 | 50 | 80 |
| Reaction Time, hrs[b] | 19½ | 20 | 19 | 67 | 67 | 20 | 20 |
| Results | | | | | | | |
| Polymer yield, % | 89.6 | 73.7 | 79.7 | 81.7 | 87.2 | 84.0 | 80.7 |
| Polymer mol. wt. × $10^{-3}$[c] | 235 | 205 | 235 | 225 | 135 | 175 | 185 |
| Polymer unsaturation | | | | | | | |
| Vinyl, % | 5.3 | 9.7 | 7.1 | 6.3 | 5.7 | 5.2 | 5.2 |
| Cis, % | 87.1 | 36.9 | 20.2 | 13.8 | 79.3 | 27.6 | 14.5 |
| Trans, % | 7.6 | 53.4 | 72.7 | 79.9 | 15.0 | 67.2 | 80.3 |

[a]$AlEt_3$ and THT were premixed before being added to reaction mixture.
[b]Complete reaction usually occurred within a period of time much shorter than those indicated in the table.
[c]According to the correlation of Johnson and Wolfangel, Ind. Eng. Chem., 44, 752 (1952).

TABLE IV

EFFECT OF THT ADDITION ON BUTADIENE POLYMERIZATION WITH $TiBr_4$-$xAlI_3$-$yAlR_3$ CATALYSTS

| Catalyst | (100 g butadiene, 500 ml benzene, room temp.) | | | |
|---|---|---|---|---|
| | 19 | 20 | 21 | 22 |
| $TiBr_4$, mg | | 36.8 | | 36.8 |
| $AlI_3$, mg | | 122.3 | | 204.0 |
| $AlEt_3$, mg[a] | | 102.7 | | 137.0 |
| THT, mg[a] | 0 | 70 | 0 | 60 |
| $AlEt_3$/$AlI_3$/$TiBr_4$ molar ratio | | 9/3/1 | | 12/5/1 |
| THT/$TiBr_4$ molar ratio | 0 | 70 | 0 | 60 |
| Reaction Time, hrs[b] | 91 | 17½ | 19 | 91 |
| Results | | | | |
| Polymer yield, % | 83.8 | 80.8 | 85.5 | 80.1 |
| Polymer mol. wt. × $10^{-3}$[c] | 210 | 265 | 120 | 300 |
| Polymer unsaturation | | | | |
| Vinyl, % | 5.2 | 8.4 | 5.5 | 3.8 |
| Cis, % | 84.9 | 16.5 | 77.4 | 23.1 |
| Trans, % | 9.9 | 75.1 | 17.1 | 73.1 |

[a]$AlEt_3$ and THT were premixed before being added to the reaction mixture.
[b]Complete reaction usually occurred within a period of time much shorter than those indicated in the table.
[c]According to the correlation of Johnson and Wolfangel, Ind. Eng. Chem., 44, 752 (1952).

TABLE V

EFFECT OF THE ADDITION OF BUTADIENE POLYMERIZATION WITH $TiX_4$-$xSnI_4$-$yAlR_3$ CATALYSTS

| Catalyst | (100 g butadiene, 500 ml benzene, room temp.) | | | | | |
|---|---|---|---|---|---|---|
| | 23 | 24 | 25 | 26 | 27 | 28 |
| $TiCl_4$, mg | 19.0 | | 19.0 | | | |
| $TiBr_4$, mg | — | | — | | 36.8 | |
| $SnI_4$, mg | 125.3 | | 187.9 | | 187.9 | |
| $AlEt_3$, mg[a] | 102.7 | | 137.0 | | 137.0 | |
| THT, mg[a] | — | 529.0 | — | 617.2 | — | 441.0 |

TABLE V—Continued

EFFECT OF THE ADDITION OF BUTADIENE POLYMERIZATION WITH $TiX_4$-$xSnI_4$-$yAlR_3$ CATALYSTS (100 g butadiene, 500 ml benzene, room temp.)

| Catalyst | 23 | 24 | 25 | 26 | 27 | 28 |
|---|---|---|---|---|---|---|
| $AlEt_3/SnI_4/TiX_4$ molar ratio | 9/2/1 | | 12/3/1 | | 12/3/1 | |
| $THT/TiX_4$ molar ratio | 0 | 60 | 0 | 70 | 0 | 50 |
| Reaction Time, hrs[b] | 19½ | 18½ | 19½ | 18½ | 91 | 18 |
| Results | | | | | | |
| Polymer yield, % | 76.3 | 80.8 | 75.2 | 81.9 | 82.9 | 72.5 |
| Polymer mol. wt. × $10^{-3(c)}$ | 230 | 270 | 185 | 235 | 145 | 250 |
| Polymer unsaturation | | | | | | |
| Vinyl, % | 5.2 | 5.8 | 5.4 | 3.4 | 5.0 | 3.5 |
| Cis, % | 88.1 | 16.8 | 87.0 | 14.7 | 87.9 | 23.9 |
| Trans, % | 6.7 | 78.4 | 7.6 | 81.9 | 7.1 | 72.6 |

[a] $AlEt_3$ and THT were premixed before being added to the reaction mixture.
[b] Complete reaction usually occurred within a period of time much shorter than those indicated in the table.
[c] According to the correlation of Johnson and Wolfangel, Ind. Eng. Chem., 44, 752 (1952).

EXAMPLES 29-33

In Belgian Pat. No. 551,851, it is shown that a catalyst system comprising $TiI_4$ and a trialkyl aluminum polymerize 1,3-butadiene to yield a polybutadiene having 85–95% cis-1,4 configuration.

To show the unique advantage of the present invention, i.e., use of a Lewis base to modify the steric configuration of butadiene based polymers, a series of experiments were conducted polymerizing 1,3-butadiene. The catalyst system used was $TiI_4$—$AlR_3$ using tetrahydrothiophene (THT). The mole ratio of THT to $TiI_4$ was varied from 10 up to 30. The Al triethyl ($AlEt_3$) and THT were premixed before addition to the reactor.

The polymerization was terminated and polymer recovered in the same manner as used in Examples 1-4. The results are shown in Table VI.

EXAMPLES 34-40

Several butadiene-1,3 polymerizations were conducted with the catalyst system and procedure of Examples 29-33, above. However, the THT was added to the reaction mixture after the $AlEt_3$. Results are in Table VII.

TABLE VI

EFFECT OF THT ADDITION ON BUTADIENE POLYMERIZATION WITH $TiI_4$ BASED CATALYSTS (100 g butadiene, 500 ml benzene, room temp.)

| Catalyst | 29 | 30 | 31 | 32 | 33 |
|---|---|---|---|---|---|
| $TiI_4$, mg | | | 111 | | 167 |
| $AlEt_3$, mg | | | 68.5 | | 102.8 |
| THT, mg[a] | 0 | 176.3 | 352.7 | 529.0 | 793.5 |
| $AlEt_3/TiI_4$ molar ratio | | | 3 | | |
| $THT/TiI_4$ molar ratio | 0 | 10 | 20 | 30 | 30 |
| Reaction Time, hrs[b] | 19 | 19 | 20 | 20½ | 18¾ |
| Results | | | | | |
| Polymer yield, % | 83 | 86.6 | 83.7 | 78.4 | 90.5 |
| Polymer mol. wt. × $10^{-3(c)}$ | 240 | 205 | 425 | 295 | 445 |
| Polymer unsaturation | | | | | |
| Vinyl, % | 4.6 | 5.7 | 5.0 | 4.3 | 3.6 |
| Cis, % | 91.3 | 62.3 | 34.7 | 22.1 | 13.7 |
| Trans, % | 4.1 | 32.0 | 60.4 | 73.6 | 82.7 |

[a] $AlEt_3$ and THT were premixed before being added to the reaction mixture.
[b] Complete reaction usually occurred within a period of time much shorter than those indicated in the table.
[c] According to the correlation of Johnson and Wolfangel for cis-1,4 polybutadiene, Ind. Eng. Chem., 44, 752 (1952).

TABLE VII

EFFECT OF THT ADDITION ON BUTADIENE POLYMERIZATION WITH $TiI_4$ BASED CATALYSTS (100 g butadiene, 500 ml benzene, room temp.)

| Catalyst | 34 | 35 | 36 | 37 | 38 | 39 | 40 |
|---|---|---|---|---|---|---|---|
| $TiI_4$, mg | | | | 111 | | | |
| $AlEt_3$, mg | 57.1 | | | 68.5 | | 79.9 | |
| THT, mg[a] | 529 | 176.3 | 352.7 | 529 | 705.4 | 529 | 0 |
| $AlEt_3/TiI_4$ molar ratio | 2.5 | | | 3 | | 3.5 | |
| $THT/TiI_4$ molar ratio | 30 | 10 | 20 | 30 | 40 | 30 | 0 |
| Reaction Time, hrs[b] | 21 | 18-2/3 | 20¼ | 18¼ | 21 | 20 | 18½ |
| Results | | | | | | | |
| Polymer yield, % | 12.5 | 74.1 | 73.1 | 78.2 | 76.1 | 83.2 | 90.0 |
| Polymer mol. wt. × $10^{-3(c)}$ | 335 | 165 | 200 | 250 | 460 | 340 | 225 |
| Polymer unsaturation | | | | | | | |
| Vinyl, % | 2.7 | 7.4 | 4.9 | 4.0 | 3.0 | 6.2 | 5.6 |
| Cis, % | 17.7 | 59.2 | 28.1 | 17.7 | 12.0 | 21.9 | 89.3 |
| Trans, % | 79.5 | 33.4 | 78.4 | 78.4 | 85.0 | 71.9 | 5.1 |

[a] Added immediately after the $AlEt_3$.
[b] See Table VI, footnote [b].
[c] See Table VI, footnote [c].

What is claimed is:

1. A hydrocarbon-soluble catalyst system for the polymerization of conjugated diolefins to produce a polymer having from 50 to about 90% trans-1,4 addition units, consisting essentially of:
   a. Ti(halide)$_4$—M$_n$I$_m$ wherein the halide may be I, Cl, or Br; M is aluminum or tetravalent tin; $n$ is 0 or 1; $m$ is the valence of M and when $n$ is 0, $m$ is 2; and when the halide is I, M$_n$I$_m$ is omitted;
   b. an aluminum alkyl having the formula AlR$_2$X$_{3-a}$ wherein R is an alkyl having 1 to 12 carbon atoms, X is Cl, Br or I, $a$ is a number 2 to 3, and the molar ratio of the aluminum alkyl to Ti(halide)$_4$—M$_n$I$_m$ being in the range from 20:1 to 1:1;
   c. a Lewis base selected from the group consisting of tetrahydrothiophene, tetrahydrothiopyran, tetrahydrofuran, tetrahydropyran, 2-methyl tetrahydrothiophene and 2,5-dimethyl tetrahydrofuran, the mole ratio of Lewis base to Ti(halide)$_4$ being in the range of from 1:1 to 500:1.

2. The catalyst system of claim 1, wherein the Ti(halide)$_4$—M$_n$I$_m$ is TiI$_4$.

3. The catalyst system of claim 1, wherein the Ti(halide)$_4$—M$_n$I$_m$ is TiCl$_4$—I$_2$.

4. The catalyst system of claim 1, wherein the Ti(halide)$_4$—M$_n$I$_m$ is TiCl$_4$—AlI$_3$.

5. The catalyst system of claim 1, wherein the Ti(halide)$_4$—M$_n$I$_m$ is TiCl$_4$—SnI$_4$.

6. The catalyst system of claim 1, wherein the Ti(halide)$_4$—M$_n$I$_m$ is TiBr$_4$—SnI$_4$.

7. The catalyst system of claim 1, wherein the aluminum alkyl is aluminum trialkyl.

8. The catalyst system of claim 1, wherein the Lewis base is tetrahydrothiophene.

9. A hydrocarbon-soluble catalyst system consisting essentially of:
   a. TiCl$_4$—AlI$_3$;
   b. an aluminum trialkyl where the alkyl has from 1-12 carbon atoms, the molar ratio of aluminum trialkyl to TiCl$_4$—AlI$_3$ being in the range of from 2:1 to 4:1; and
   c. a Lewis base selected from the group consisting of tetrahydrothiophene, tetrahydropyran, tetrahydrofuran, tetrahydrothiopyran, or 2,5-dimethyl tetrahydrofuran, the mole ratio of Lewis base to TiCl$_4$ being in the range of 10:1 to 200:1.

10. A hydrocarbon-soluble catalyst system consisting essentially of:
    a. TiI$_4$;
    b. an aluminum trialkyl where the alkyl has from 1-12 carbon atoms, the molar ratio of aluminum trialkyl to TiI$_4$ being in the range of from 20:1 to 1:1; and
    c. a Lewis base selected from the group consisting of tetrahydrothiophene, tetrahydropyran, tetrahydrofuran, tetrahydrothiopyran, or 2,5-dimethyl tetrahydrofuran, the mole ratio of Lewis base to TiI$_4$ being in the range of 10:1 to 200:1.

11. A hydrocarbon-soluble catalyst system consisting essentially of:
    a. TiCl$_4$—I$_2$;
    b. an aluminum trialkyl where the alkyl has from 1-12 carbon atoms, the molar ratio of aluminum trialkyl to TiCl$_4$—I$_2$ being in the range of from 20:1 to 1:1; and
    c. a Lewis base selected from the group consisting of tetrahydrothiophene, tetrahydropyran, tetrahydrofuran, tetrahydrothiopyran, or 2,5-dimethyl tetrahydrofuran, the mole ratio of Lewis base to TiCl$_4$ being in the range of 10:1 to 200:1.

12. A hydrocarbon-soluble catalyst system consisting essentially of:
    a. TiCl$_4$—SnI$_4$;
    b. an aluminum trialkyl where the alkyl has from 1-12 carbon atoms, the molar ratio of aluminum trialkyl to TiCl$_4$—SnI$_4$ being in the range of from 2:1 to 4:1; and
    c. a Lewis base selected from the group consisting of tetrahydrothiophene, tetrahydropyran, tetrahydrofuran, tetrahydrothiopyran, or 2,5-dimethyl tetrahydrofuran, the mole ratio of Lewis base to TiCl$_4$ being in the range of 10:1 to 200:1.

* * * * *